US008636486B2

(12) United States Patent  (10) Patent No.: US 8,636,486 B2
Colombo et al.  (45) Date of Patent: Jan. 28, 2014

(54) ACCURATE POWDER METAL COMPONENT, ASSEMBLY AND METHOD

(75) Inventors: Gustavo Osvaldo Colombo, Chivilcoy (AR); Carlos E. Camelo, Worcester, MA (US); Ian W. Donaldson, Jefferson, MA (US)

(73) Assignee: GKN Sinter, LLC, Auburn Hills, MI (US)

( * ) Notice: Subject to any disclaimer, the term of this patent is extended or adjusted under 35 U.S.C. 154(b) by 849 days.

(21) Appl. No.: 12/676,514

(22) PCT Filed: Sep. 5, 2008

(86) PCT No.: PCT/US2008/075377
§ 371 (c)(1),
(2), (4) Date: Mar. 4, 2010

(87) PCT Pub. No.: WO2009/033007
PCT Pub. Date: Mar. 12, 2009

(65) Prior Publication Data
US 2010/0178190 A1  Jul. 15, 2010

Related U.S. Application Data

(60) Provisional application No. 60/967,870, filed on Sep. 7, 2007.

(51) Int. Cl.
*F04C 2/10* (2006.01)
*F16H 55/08* (2006.01)
*F16H 55/17* (2006.01)
*B22F 3/00* (2006.01)
*B22F 5/08* (2006.01)

(52) U.S. Cl.
USPC ........... 418/161; 418/160; 418/162; 418/163; 418/164; 418/165

(58) Field of Classification Search
USPC .................................... 418/160–166
See application file for complete search history.

(56) References Cited

U.S. PATENT DOCUMENTS 4,464,141 A * 8/1984 Brown ............................ 464/75
6,244,413 B1 * 6/2001 Gutmann et al. ............. 192/108

(Continued)

FOREIGN PATENT DOCUMENTS

DE 2315630 A1 10/1974
JP S49-129203 A 12/1974

(Continued)

OTHER PUBLICATIONS

International Search Report and Written Opinion as mailed on Feb. 19, 2009 for International Patent Application PCT/US2008/075377.
Japanese Patent Office, Notification of Reason for Refusal for corresponding Japanese Application No. 2010-524175, Dispatch Date: Mar. 12, 2013, which cites the references cited herein.

*Primary Examiner* — Kenneth Bomberg
*Assistant Examiner* — Dapinder Singh
(74) *Attorney, Agent, or Firm* — Quarles & Brady LLP (57) ABSTRACT

The invention provides an accurate powder metal component having a body with opposed surfaces at least one of which has at least one projection of smaller cross-sectional area than the main portion of the body of the component. The distance from the free end of the projection to the opposite end of the component defines one dimension of the component that must be relatively accurate, in one embodiment to slide against and form a seal that inhibits liquid flow against another component of an assembly. In the manufacturing method, the powdered metal component is made by compaction to form the body including a projection at the end, is sintered and thereafter is reduced in the dimension between the end of the projection and the opposite end of the component by coining the free end of the projection so as to reduce the dimension to within a tolerance of the nominal specified dimension.

8 Claims, 12 Drawing Sheets

(56) References Cited

U.S. PATENT DOCUMENTS

| | | | |
|---|---|---|---|
| 6,370,979 B1 * | 4/2002 | Tauschek et al. | 74/462 |
| 6,425,749 B1 * | 7/2002 | Lettner et al. | 418/182 |
| 6,565,341 B2 * | 5/2003 | Bodzak | 418/182 |
| 6,626,277 B2 * | 9/2003 | Hauf | 192/53.1 |
| 6,974,012 B2 | 12/2005 | Rau et al. | |
| 7,607,906 B2 * | 10/2009 | Yates et al. | 418/206.7 |
| 2003/0183479 A1 * | 10/2003 | Rau et al. | 192/108 |
| 2007/0071625 A1 * | 3/2007 | Friedman | 418/9 |
| 2008/0232994 A1 * | 9/2008 | Hosono | 418/191 |

FOREIGN PATENT DOCUMENTS

| | | |
|---|---|---|
| JP | S50-127808 A | 10/1975 |
| JP | S55-50405 A | 4/1980 |
| JP | S64-25485 U1 | 2/1989 |
| JP | H05-37926 U | 5/1993 |
| JP | 2006-233771 | 9/2006 |
| JP | 2006-249953 | 9/2006 |
| KR | 10-2003-0023637 | 3/2003 |

* cited by examiner

ACCURATE POWDER METAL COMPONENT, ASSEMBLY AND METHOD

CROSS-REFERENCE TO RELATED APPLICATIONS

The present application claims the benefit of U.S. Provisional Patent Application No. 60/967,870 filed Sep. 7, 2007, and the benefit of PCT International Application No. PCT/US2008/075377 filed on Sep. 5, 2008, both applications are incorporated herein by reference.

STATEMENT REGARDING FEDERALLY SPONSORED RESEARCH OR DEVELOPMENT

Not applicable.

FIELD OF THE INVENTION

This invention relates to sintered powered metal components that must be made to precise dimensions.

BACKGROUND OF THE INVENTION

Sintered powder metal components are well known in the art. An advantage of making a component of sintered powder metal is that it can be formed to near net shape. Usually, due to variability in the manufacturing process, if a powder metal part must have precise dimensions, it must have material removed by a machining process to obtain the required precision. Such processes result in time and tooling expense, and do not necessarily improve the material characteristics of the component, other than to make it of precise dimensions. This invention addresses these issues in some types of sintered powder metal components.

SUMMARY OF THE INVENTION

The invention provides an accurate powder metal component, assembly and method in which the powder metal component has a body with opposed surfaces at least one of which has at least one projection of smaller cross-sectional area than the main portion of the body of the component. The distance from the free end of the projection to the opposite end of the component defines one dimension of the component that must be accurate. The powdered metal component is made by compaction to form the body including a projection at the end, is sintered and thereafter is reduced in the dimension between the end of the projection and the opposite end of the component by coining the free end of the projection so as to reduce the dimension to within a tolerance of the nominal specified dimension.

The invention may advantageously be applied to a pump gear, for example a gerotor gear.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

Reference is hereby made to the following figures in which:

FIG. 1b is a perspective view of the sintered powder metal gerotor gear with coining projections of FIG. 1a;

FIG. 7b is a cross-sectional view of the sintered powder metal bushing component with coining projections of FIG. 7a;

FIG. 8b is a cross-sectional view of the sintered powder metal spacer component with coining projections of FIG. 8a;

DETAILED DESCRIPTION OF THE INVENTION

Figure 1A:
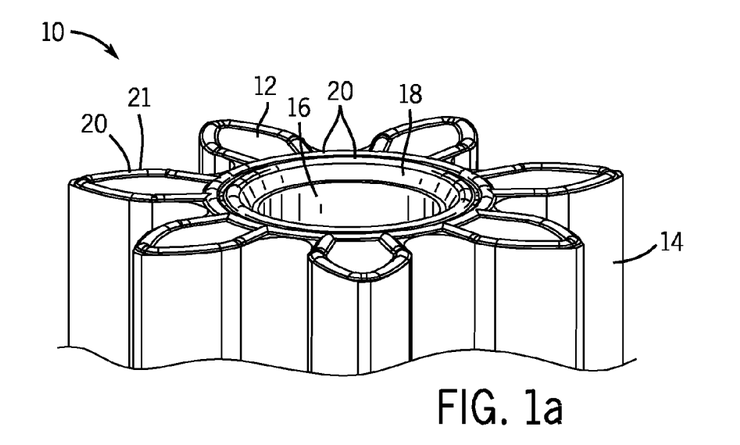
FIG. 1a is a perspective view of a sintered powder metal gerotor gear with coining projections.
Figure 1B:
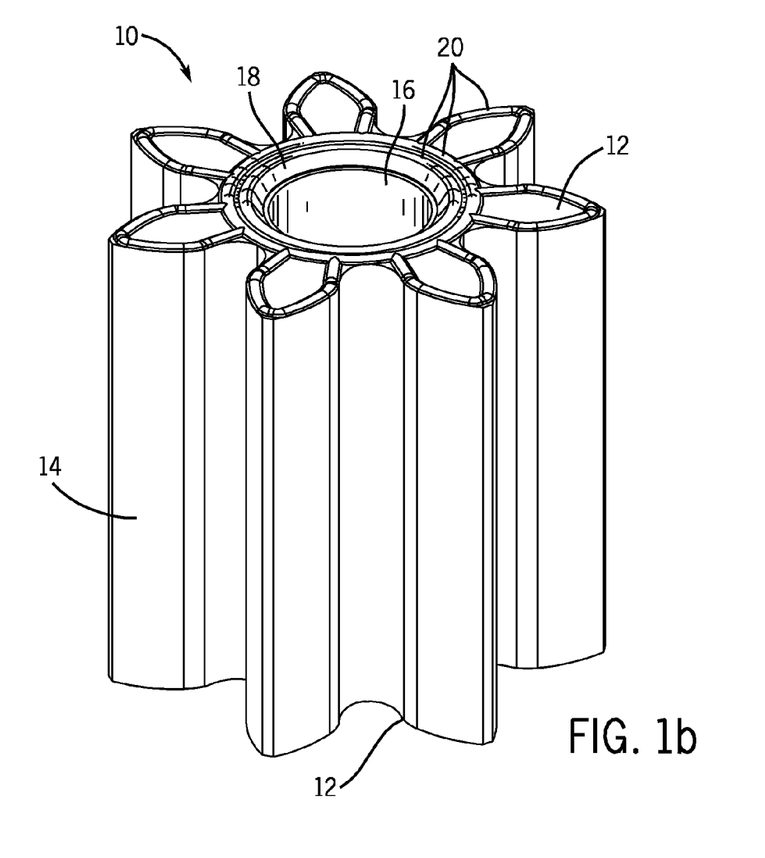
Figure 10:
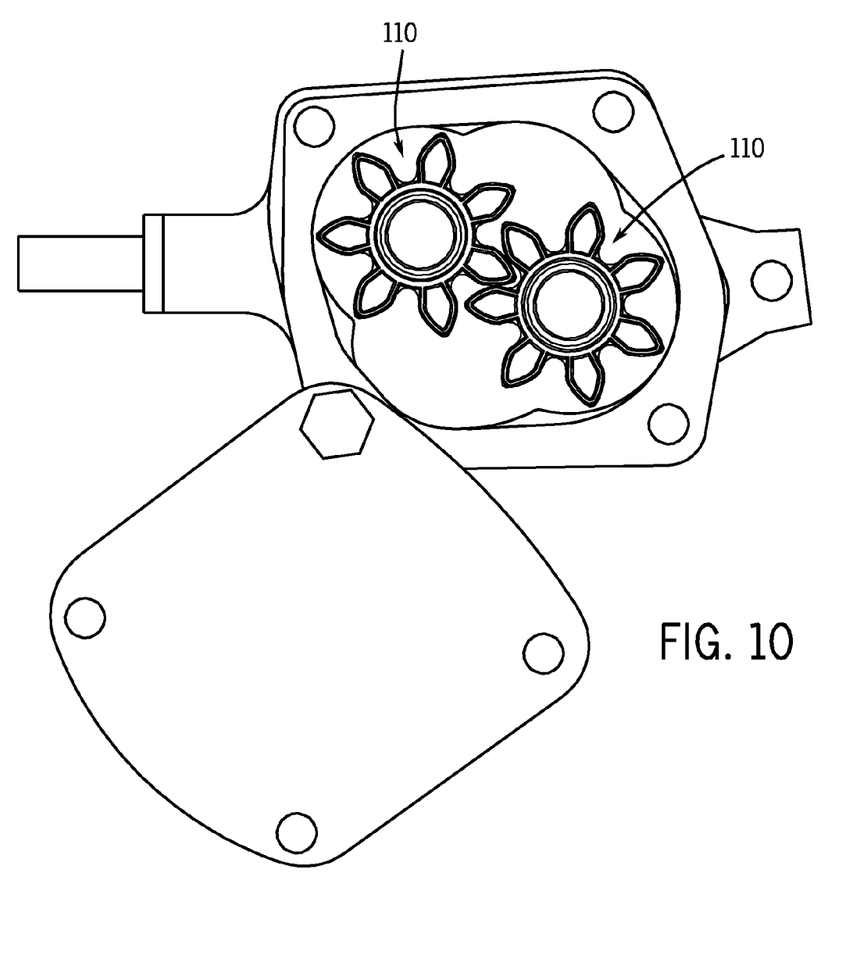
FIG. 10 is a view of a gerotor pump with the cover of the housing partially removed to show the end faces of the gerotor gears that rotate against the cover.

This invention relates to powder metal components that require a narrow range of dimensional tolerances. Several types of example components are described in the following paragraphs. One application that requires components of accurate dimensional tolerances is gerotor pumps. In this application, gerotor gears have a narrow thickness tolerance to ensure adequate sealing of the pump, since the ends of the gear seal against surfaces of the pump housing as illustrated in FIG. 10, at the sliding interface of the end of the gear against the pump housing. This example application is addressed in FIGS. 1 through 6. Referring to FIG. 1, a sintered powder metal gerotor pump gear 10 includes opposed surfaces 12, tooth surfaces 14, a bore 16, a chamfer 18 between the opposed surfaces 12 and the bore 16, and coining projections 20. The shape of coining projections 20 is preferably tapered, for example semi-circular, in cross-section to minimize surface area toward the free end. The free end of the projection is flattened and slides against the adjacent surface of the housing to create a sliding seal. Alternatively, the shape of coining projections 20 may be triangular, trapezoidal, or any other cross-sectional shape that tapers from a root or base of the projection that is integral with the body of the gear to a free end 21.

Coining projections 20 are located, in general, along the periphery of opposed surfaces 12 and extend axially. Preferably, coining projections 20 are located at locations on the opposed surfaces 12 to ensure adequate sealing against adjacent surfaces of a mating component, such as a pump housing, that the free ends of the projections slide against. For example, coining projections 20 may be located along the edges of the gear teeth, in a circular form adjacent to the root diameter of the gear teeth and in another circular form spaced radially inward of the root of the gear teeth, adjacent to the chamfer 18 that leads in to the axial bore 16 through the gear 10.

The gerotor gear size, i.e. bore diameter, number of teeth, diametral pitch, tooth pressure angle, gear thickness, and tooth profile shape, etc., may be determined as appropriate for the application in which the sintered powder metal gerotor gear 10 is used.

Figure 2A:
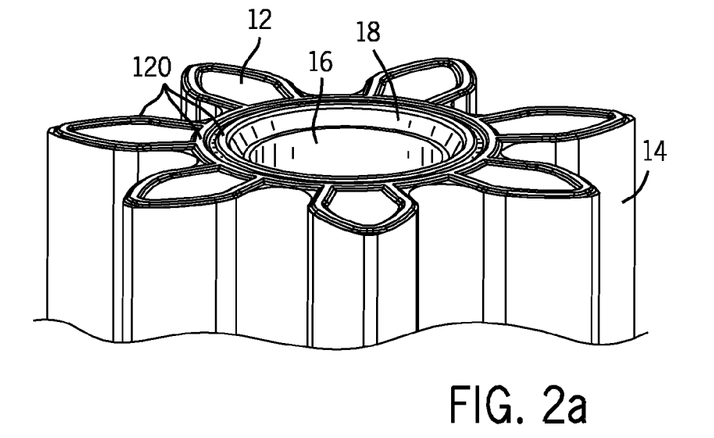
FIG. 2a is a perspective view of a coined sintered powder metal gerotor gear with coined projections.
Figure 2B:
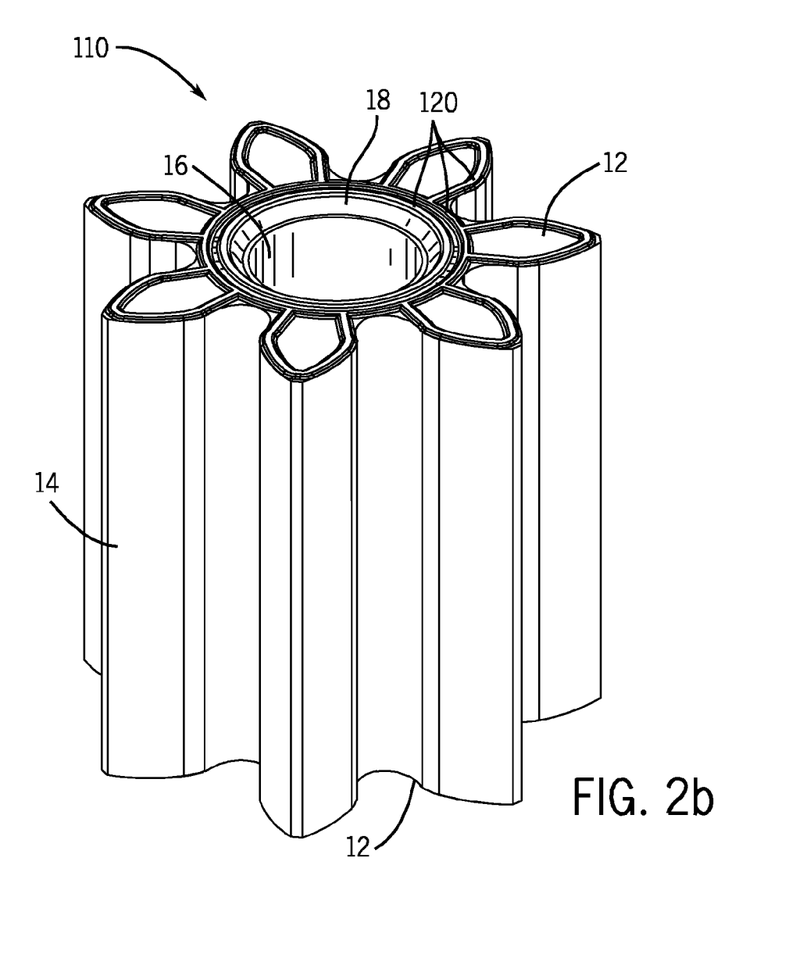
FIG. 2b is a perspective view of the coined sintered powder metal gerotor gear with coined projections of FIG. 2b.
Figure 6A:
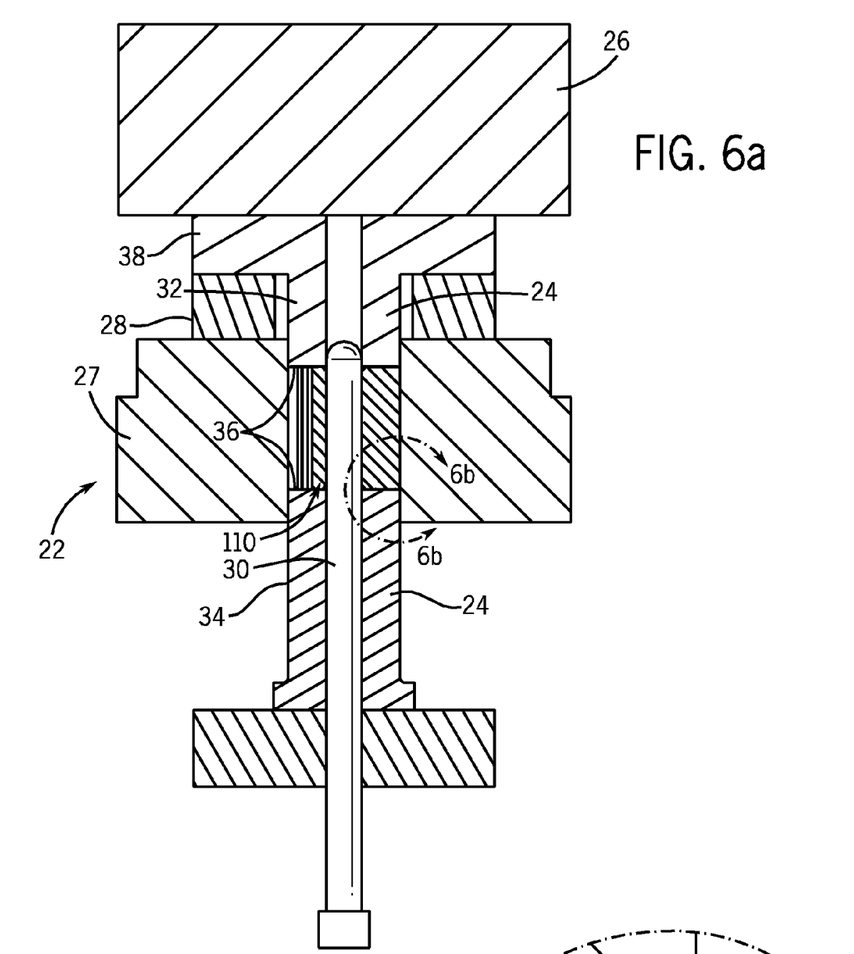
FIG. 6a is a cross-sectional view of the coining apparatus of FIG. 3 illustrating flattening of the coining projections.
Figure 6B:
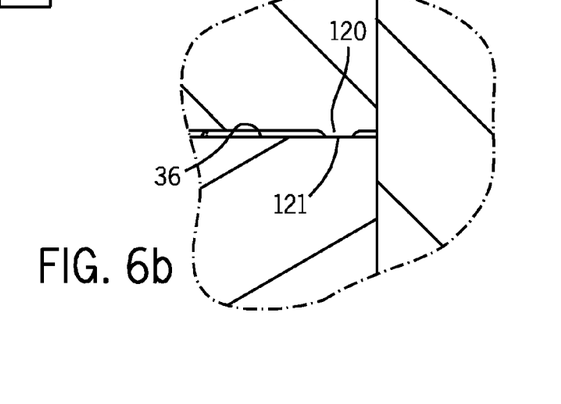
FIG. 6b is a detail view of the area 6b-6b of FIG. 6a illustrating flattening of the coining projections.

Referring to FIG. 2, a coined sintered powder metal gerotor gear 110 includes the above features with coined projections 120 formed from the coining projections 20. Coined projections 120 include coined free ends 121 as shown in FIG. 6. Inclusion of coined free ends 121 results in highly accurate overall thickness relative to a nominal specified dimension. Coined sintered powder metal gerotor gear 110 can meet a tolerance of less than 50 microns for the nominal specified dimension. It should be understood that overall thickness refers to the distance between coined free ends 121 on opposite opposed surfaces 12 of the coined sintered powder metal gerotor gear 110. Alternatively, overall thickness refers to the distance between a coined free end 121 and the opposite opposed surface 12 if coined projections 120 are only included on a single opposed surface 12.

Coined projections 120 have a trapezoid-like shape as shown in FIG. 6. The sides of coined projections 120 adjacent to the opposed surfaces 121 are arcuate due to the original semi-circular shape of coining projections 20. Coined projections 120 have a relative density of approximately 95% at their free ends compared to the original powder metal material. Advantageously, coined projections 120 have increased strength properties compared to a non-coined PM component, and are not as porous to provide improved sealing characteristics. Another benefit is that there is a lower surface contact area between the pump gears and the housing. Advantageously, the pockets or recesses between or surrounded by coined projections 120 create reservoirs for containing fluid, which in the case of hydraulic fluid is a lubricant, resulting in increased performance, efficiency, and durability.

Figure 9:
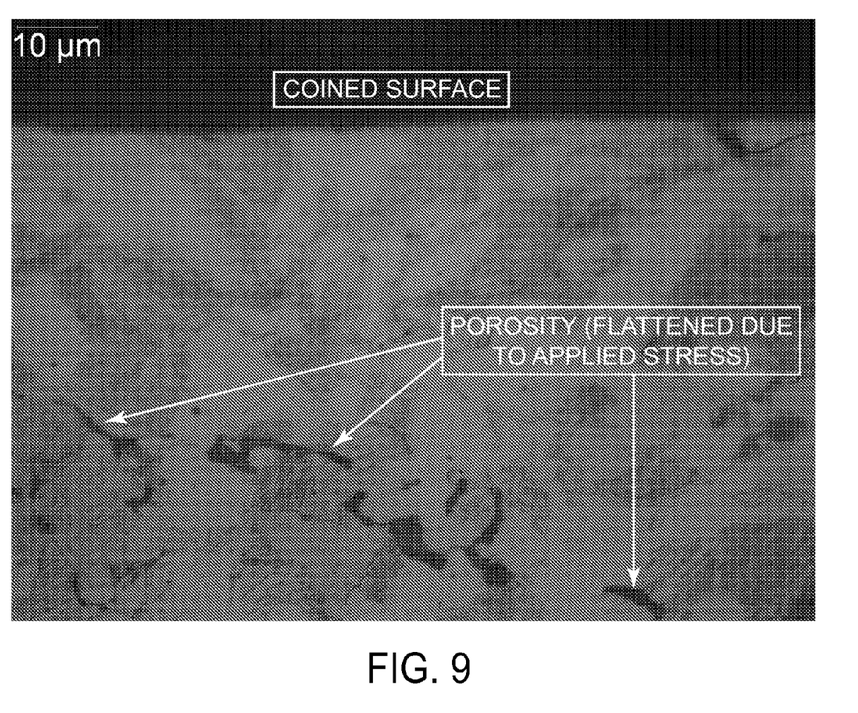
FIG. 9 is a micrograph of a coined PM material near the coined surface.

For sub-assemblies such as hydraulic pumps, gears need to have a very tight overall thickness control to ensure adequate sealing surfaces for proper operation of the pump (minimal leakage or pressure loss). The thickness tolerances that are required for these pumps are less than 50 microns, usually less than 30 microns. Current manufacturing methods can't meet these tolerance levels without the addition of a secondary machining operation. The ribs of the current invention may be provided in powder metal punches (top and/or bottom) along the outer profile or perimeter or other surfaces on the ends of the parts. This feature provides a raised region that projects beyond the surface of the part faces, formed by the punches, that can be subsequently plastically deformed to a very accurate overall thickness tolerance during a coining operation. This deformation region provides the sealing surface for a pump assembly in the case of gerotor gears. During the application of a stress field on the porous material at the ends of the ribs during the coining operation causes a flattening of pores causing a decrease in thickness or elevation of the raised region, as shown in the micrograph of FIG. 9. With increasing thickness reduction, after attaining about 95% of full density, the compressive strength of material increases rapidly. The plastic deformation becomes the predominant densification mechanism with limited further closing of the pores.

Figure 3:
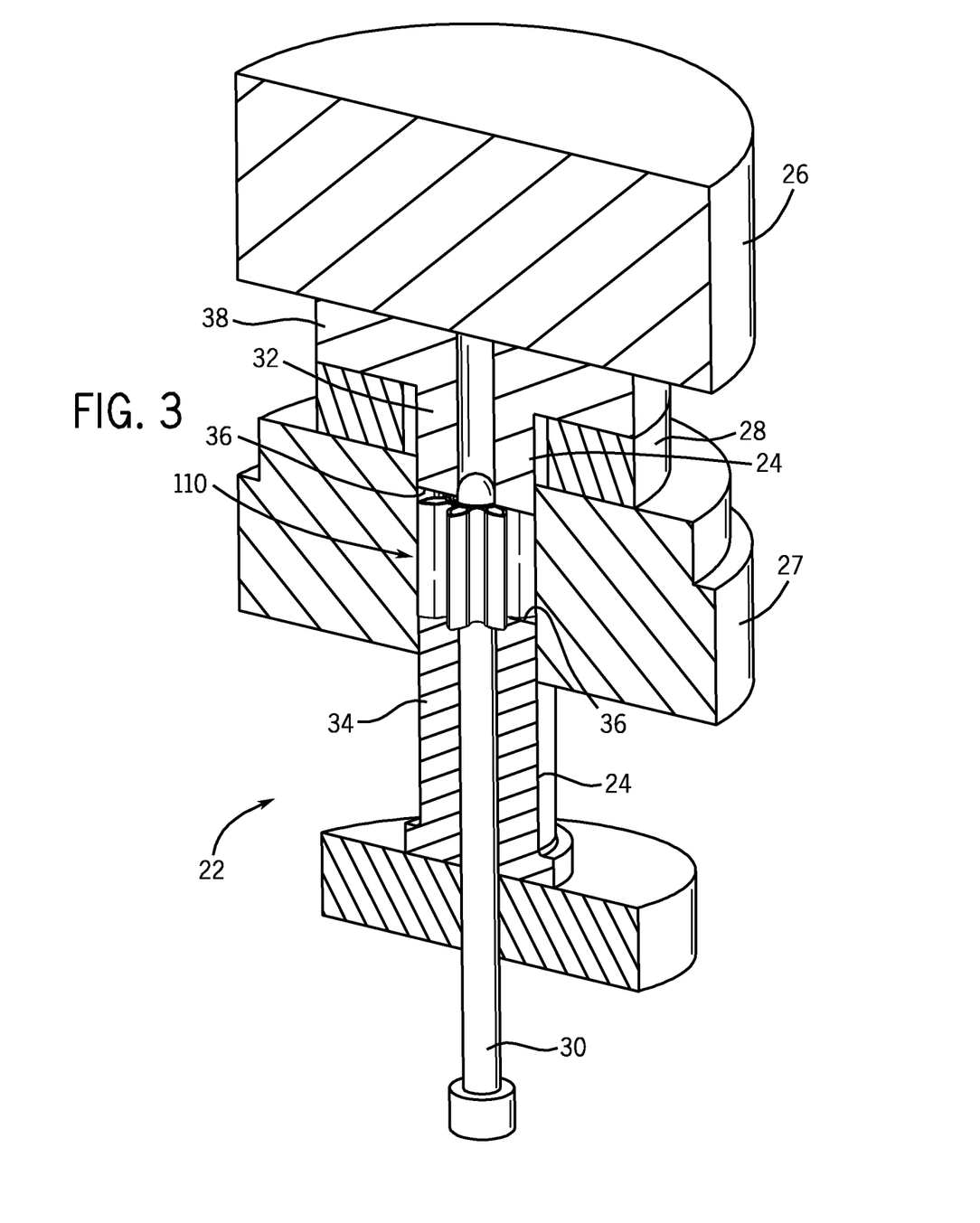
FIG. 3 is a perspective cross-sectional view of a coining apparatus.
Figure 4:
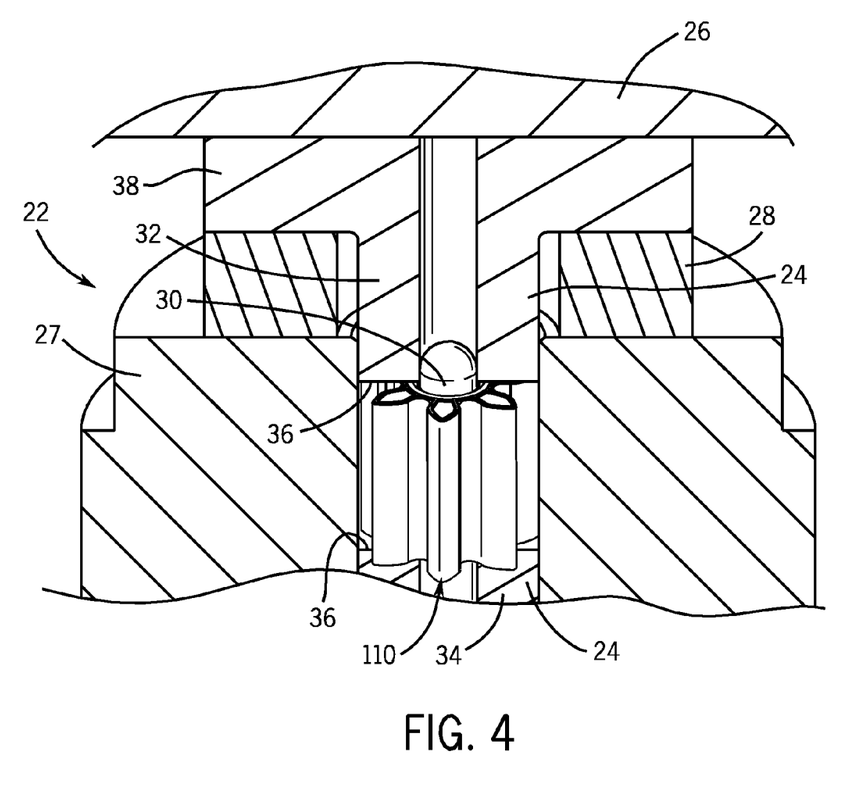
FIG. 4 is a perspective cross-sectional view of the coining apparatus of FIG. 3.
Figure 5:
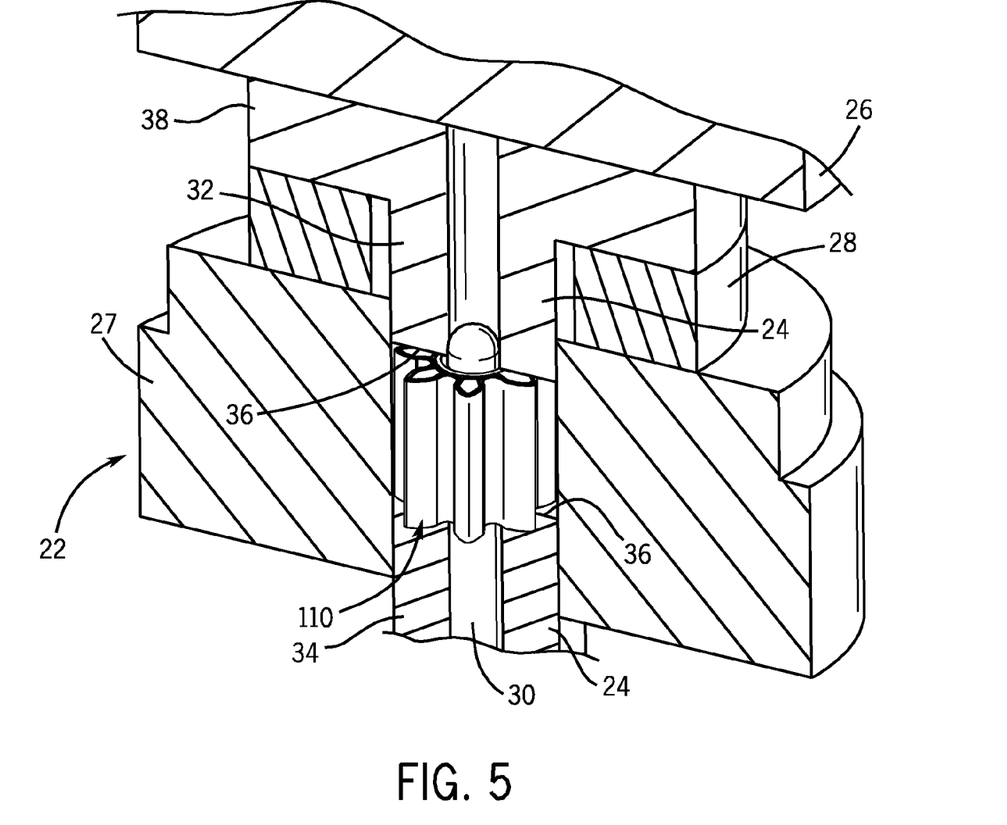
FIG. 5 is a perspective cross-sectional view of the coining apparatus of FIG. 3.

The process for creating a coined sintered powder metal gerotor gear 110 is as follows: a powder metal mixture is created which may include iron, steel, aluminum, bronze, brass, or any mixture that is well known in the art for making conventional PM gerotor gears, or other parts if the invention is applied to a different part. The powder metal mixture is placed in a forming die and compacted in the die with punches from above and/or below. The forming die includes the negative shape of the tooth surfaces 14 on the powder metal part. The punches include the negative shape of the opposed surfaces 12 of the part, including the coining projections 20. Such apparatuses are well known in the art, and may be driven by hydraulic or mechanical devices. Next, the compacted powder metal gerotor gear is sintered. Sintering time, temperature, and environment can be chosen based on the selected powder metal mixture. Such combinations are well known in the art. Sintering results in a near net shape sintered powder metal gerotor gear 10. Typically after being cooled, sintered powder metal gerotor gear 10 is coined in a coining apparatus 22 as shown in FIG. 3. Coining apparatus 22 includes tooling components 24 (which may be carbide), a hydraulic actuator or press element 26, a fixture 27, a positive stop 28, and an internal diameter support 30. Tooling components 24 may include movable upper tooling component 32 and lower tooling component 34. Tooling components 24 also include coining surfaces 36 which contact and deform coining projections 20. Upper tooling component 32 includes flange 38 which contacts the positive stop 28. Positive stop 28 causes motion of upper tooling component 32 to cease, and therefore determines the overall thickness of the coined sintered powder metal gerotor gear 110.

Other embodiments for the coining apparatus are possible. For example, a mechanical press can replace the hydraulic press. Also, the bore 16 can include coining projections 20 which form an internal spline. These projections can be deformed by the internal diameter support 30 in the coining operation. In addition, modifications to the sintering process are possible. For example, the coined sintered powder metal gerotor gear 110 may be subjected to an infiltration process to further improve the strength characteristics of the component. Such modifications to the sintering process are well known in the art. In any case, the process results in coined sintered powder metal gerotor gear 110 with coined projections 120 and coined free ends 121.

The coining process is much quicker and less expensive than a machining operation. In addition, it can be used with a variety of powder metal materials that can be plastically deformed during a coining operation, such as iron, steel, aluminum, bronze, and brass.

Figure 7A:
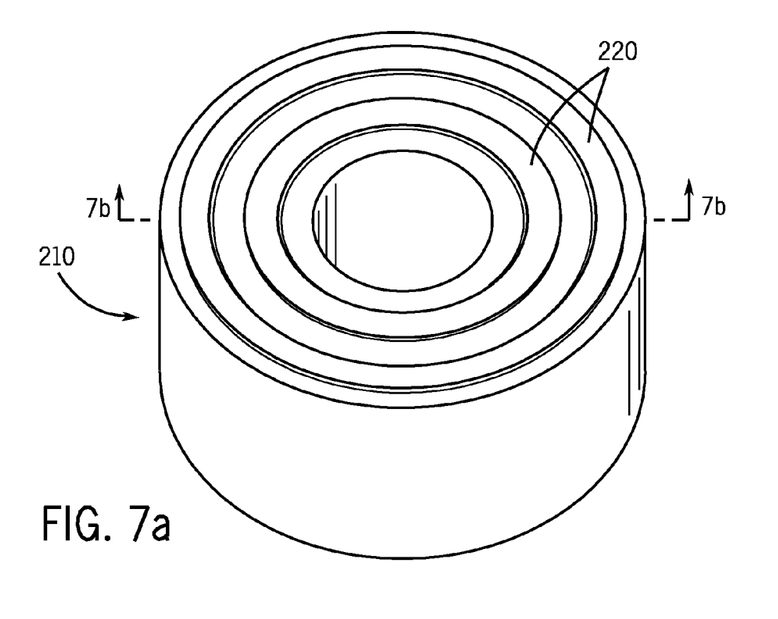
FIG. 7a is a perspective view of a sintered powder metal bushing component with coining projections.
Figure 7B:
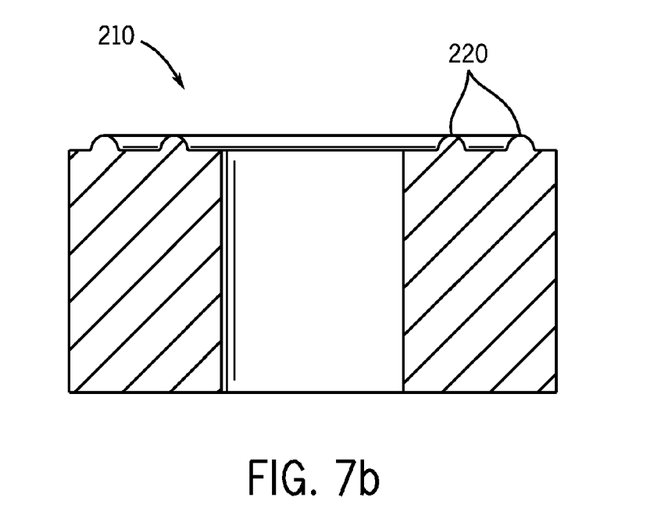
Figure 7C:
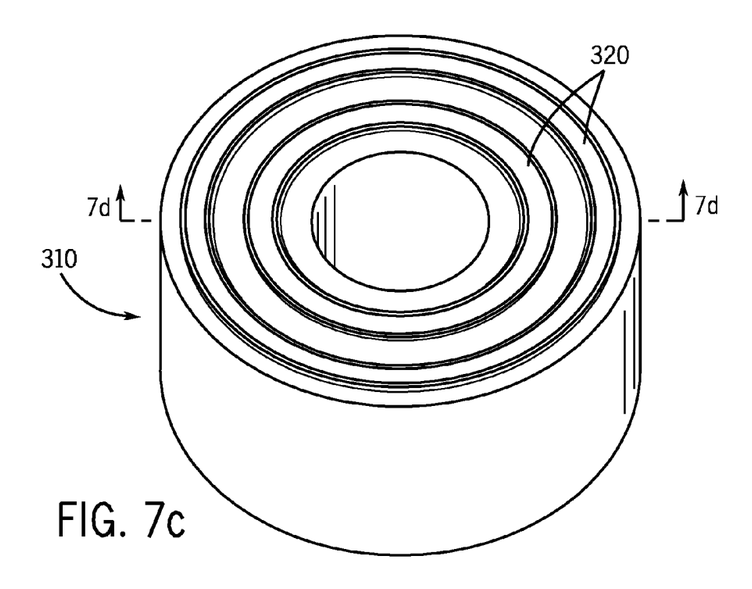
FIG. 7c is a perspective view of a coined sintered powder metal bushing component with coined projections.
Figure 7D:
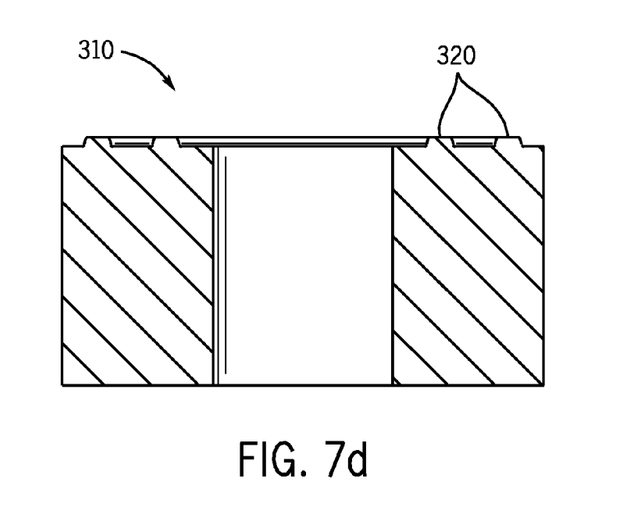
FIG. 7d is a cross-sectional view of the coined sintered powder metal bushing component with coined projections of FIG. 7c.
Figure 8A:
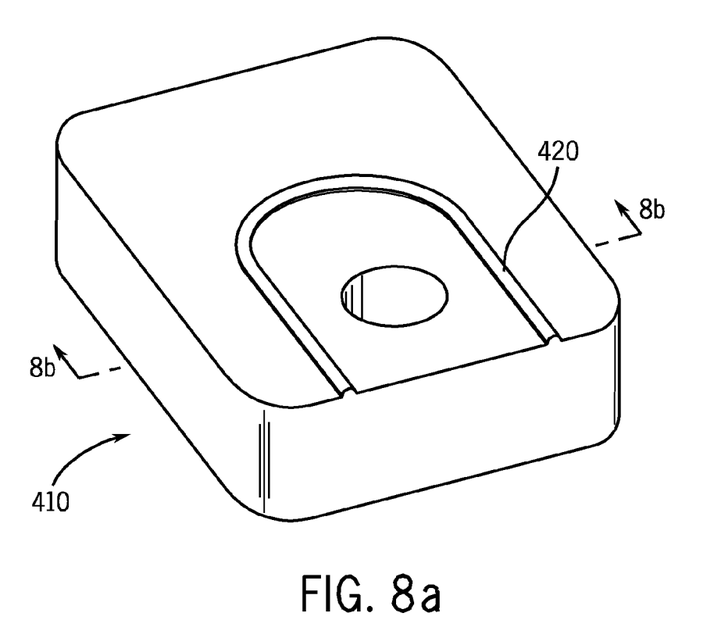
FIG. 8a is a perspective view of a sintered powder metal spacer component with coining projections.
Figure 8B:
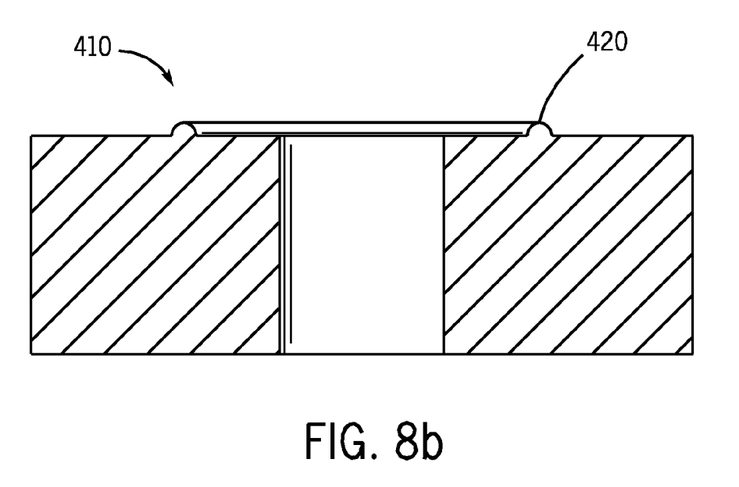
Figure 8C:
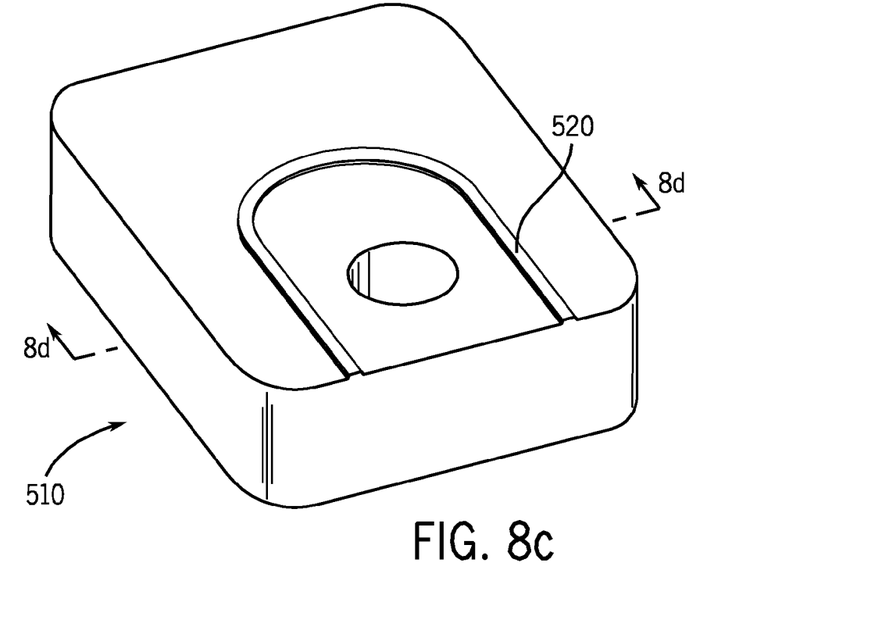
FIG. 8c is a perspective view of a coined sintered powder metal spacer component with coined projections.
Figure 8D:
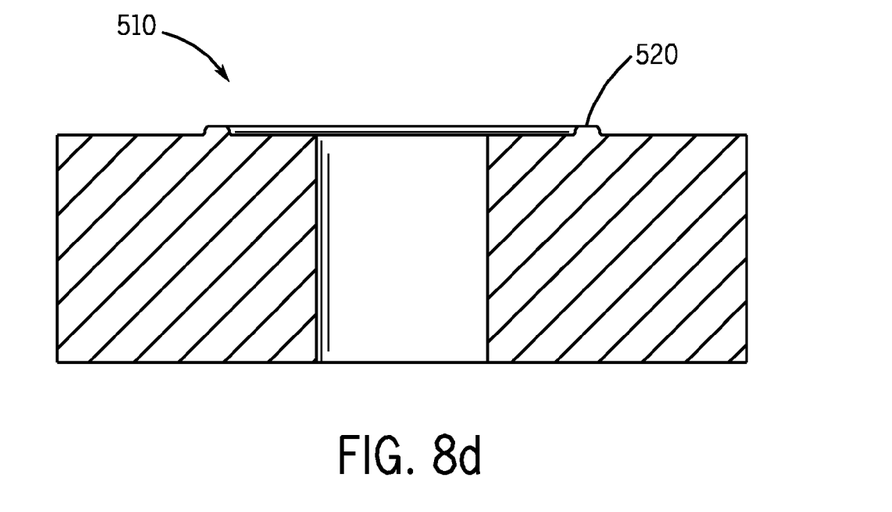
FIG. 8d is a cross-sectional view of the coined sintered powder metal spacer component with coined projections of FIG. 8c.

This process can also be used to manufacture other types of components which have a narrow range of dimensional tolerances. For example, FIG. 7a shows a sintered powder metal bushing component 210 with coining projections 220. Coining the component results in coined sintered powder metal bushing component 310 with coined projections 320, as shown in FIG. 7c. Additionally, FIG. 8a shows a sintered powder metal spacer component 410 with coining projection 420. Coining the component results in coined sintered powder metal spacer component 510 with coined projection 520. In addition, there are other types of pumps and other machines, that have gears, gear-like components or other components with ends that slide or rotate against a surface and that must be sealed against that surface, that this invention could advantageously be applied to, for example a P-pump or a ringed pump.

A preferred embodiment of the invention has been described in considerable detail. Many modifications and variations to the preferred embodiment described will be apparent to a person of ordinary skill in the art. Therefore, the invention should not be limited to the embodiment described but should be defined by the claims that follow.

We claim:

1. A sintered powder metal gerotor gear, comprising:
at least one sintered powder metal gear including a body having external tooth surfaces and the body having opposed end surfaces, both of the end surfaces being formed with a projection that extends around at least a portion of the end surfaces of the body, the projection tapering to a flattened free end of the projection;
wherein the flattened free end of the projection is obtained by plastically deforming the free end to obtain a lower porosity than a surface of at least one surface that is not plastically deformed so as to reduce a dimension from said free end to the other opposed surface to within a tolerance of a nominal specified dimension.

2. The powder metal gerotor gear of claim 1, wherein both opposed surfaces have at least one projection that tapers to a free end of the component, and both free ends are plastically deformed and of lower porosity than a surface of the adjacent surface that is not plastically deformed, so as to reduce a dimension between said free ends to within a tolerance of a nominal specified dimension.

3. The powder metal gerotor gear of claim 1, wherein the projection has arcuate sides adjacent to the free end.

4. The powder metal gerotor gear of claim 1, wherein the projection extends around a periphery of teeth of the component.

5. The powder metal gerotor gear of claim 1, wherein the projection includes a projection that extends around an axial hole that extends through the component.

6. The powder metal gerotor gear of claim 1, wherein the component is a gear and the projection includes projections that extend around a periphery of teeth of the gear, a portion of the end face at bases of the teeth, and a portion that extends around a hole through the gear.

7. The powder metal gerotor gear of claim 1, wherein the projections define a liquid reservoir on the end face.

8. A gerotor pump comprising:
a housing
at least one sintered powder metal gear including a body having external tooth surfaces and the body having opposed end surfaces, both of the end surfaces being formed with a projection that extends around at least a portion of the end surfaces of the body, the projection tapering to a flattened free end of the projection;
wherein the flattened free end of the projection is obtained by plastically deforming the free end to obtain a lower porosity than a surface of at least one surface that is not plastically deformed so as to reduce a dimension from said free end to the other opposed surface to within a tolerance of a nominal specified dimension.

* * * * *

UNITED STATES PATENT AND TRADEMARK OFFICE
CERTIFICATE OF CORRECTION

PATENT NO. : 8,636,486 B2  Page 1 of 1
APPLICATION NO. : 12/676514
DATED : January 28, 2014
INVENTOR(S) : Colombo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this
Twenty-second Day of September, 2015

Michelle K. Lee
*Director of the United States Patent and Trademark Office*